United States Patent Office 3,746,691
Patented July 17, 1973

3,746,691
SULFUR-CONTAINING POLYMERS FROM 2-OXAZOLINE AND OXAZINE MONOMERS
Donald A. Tomalia and Yancey J. Dickert, Midland, Mich., assignors to The Dow Chemical Company, Midland, Mich.
No Drawing. Original application June 16, 1969, Ser. No. 834,612, now Patent No. 3,682,948, dated Aug. 8, 1972. Divided and this application Oct. 18, 1971, Ser. No. 189,828
Int. Cl. C08g 20/00, 20/04
U.S. Cl. 260—77.5 R        2 Claims

ABSTRACT OF THE DISCLOSURE

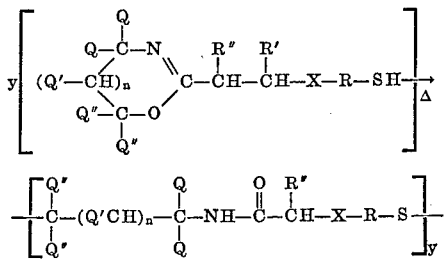

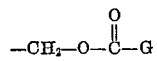

wherein R is alkylene ($C_2$–$C_{20}$), arylene ($C_6$–$C_{10}$), alkylarylene ($C_7$–$C_{15}$), alkyl- ($C_1$–$C_{10}$) or aryl- ($C_6$–$C_{10}$) thiopolyether; or R and with it X, can be void; R', R", Q' and Q" are, independently in any occurrence, hydrogen or alkyl ($C_1$–$C_4$) or R' can be phenyl; Q in any occurrence is independently hydrogen, methylol or $$-CH_2-O-\overset{O}{\underset{\|}{C}}-G$$

wherein G is alkyl ($C_{1-20}$) or phenyl ;and n is zero or 1, and y designates the molar abundance of monomer for a desired degree of polymerization; and y designates also that degree of polymerization: the substances polymerize without catalysis to obtain polyamides with useful resinous properties.

This application is a divisional application of Ser. No. 834,612, filed June 6, 1969, now U.S. Patent 3,682,948.

BACKGROUND OF THE INVENTION

Field of the invention

This invention is concerned with mercaptoalkyl- or mercaptoaryl-2-oxazolines and oxazines which are susceptible of homopolymerization or copolymerization upon the application of heat. The resulting products are resins of widespread usefulness as plastic materials, and, depending upon identity and method of cure, are readily exhibited as films, castings, fibers, paintable solvent solutions and the like, extraordinarily resistant to abrasion, impact, and the actions of solvents.

The prior art

The reaction of hydrogen sulfide with 2-phenyl-2-oxazoline to obtain N-(2-hydroxyethyl) thiobenzamide has been shown by Goldberg and Kelly, 1948 Journal of the Chemical Society (London) 1919; the attack of thioacids upon oxazoline with ring opening has been reported variously, the earliest being believed to be 18 Journal of Organic Chemistry 438, 802 (1950) by Fry; see also U.S. Patent 2,823,207 (1958).

The opening of the ring of 2-oxazoline with aromatic thiols to give N-aryl mercaptoalkyl amides has been reported variously including Wehrmeister, 28 Journal of Organic Chemistry 2587 (1963). The reversible polymerization of 1,3-oxazolidine-2-thiones, possibly involving tautomery, is discussed at 31 Journal of Organic Chemistry 32 by Mukaiyama et al.

DESCRIPTION OF THE PRESENT INVENTION

The monomers

In the present invention the monomers are compounds of the formula

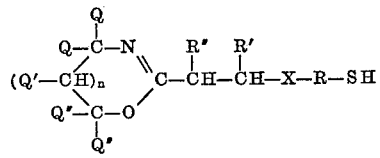

wherein R is alkylene of from 2 to 20, both inclusive, carbon atoms, arylene of from 6 to 10, both inclusive, carbon atoms, alkylarylene of from 7 to 15 carbon atoms, both inclusive, an alkylthiopolyether in any alkylene group of which there are from 1 to 10, both inclusive, carbon atoms, or an arylthiopolyether any aryl group of which is of 6 or 10 carbon atoms; or R and with it X, can be void; R', R", Q' and Q" are independently selected from hydrogen, alkyl of from 1 to 4, both inclusive, carbon atoms or R' can be phenyl; Q in any occurrence is independently hydrogen, methylol, or

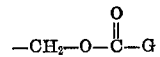

wherein G is alkyl of from 1 to 20, both inclusive, carbon atoms, or phenyl; X is sulfur, and n is zero or 1.

While all the compounds thus comprehended are monomers to be used in this invention, those of simpler molecular structure will, in general, be preferred, as being usually easier and less expensive to produce. When thermal stability of the resulting products is a major factor, then preference will usually be given to those in which all possible variable necessary moieties are aromatic. When it is desired to achieve maximum impact resistance, R will oftentimes be a polythioether chain.

In the choice of a monomer with respect to the synthesis of a polymer, a mixture of substances within the generic statement above but of dissimilar identities may be chosen, to obtain a product representing properties derived from the polymer representing such monomer mixture.

Representative and illustrative, but not limiting, monomers are designated hereinafter in conjunction with methods and starting materials for their synthesis.

Synthesis of monomers

The instant monomers are readily synthesized in various ways. In one convenient route, there is first prepared a 2-oxazoline having an ethylenic unsaturation as, or in, a substituent on the 2-carbon atom of the oxazoline ring; or a corresponding oxazine compound. This unsaturated compound is then reacted by free-radical addition with hydrogen sulfide or with a dithiol. When hydrogen sulfide is employed, the moieties designated in the generic formula by —X—R— become void. The identity of R is readily controlled by choice of the dithiol compound. In either case, thio and oxazoline or oxazine reactant are to be employed in equimolecular amounts or with thiol in excess.

The reactions are favored by the presence of a free radical reaction catalyst, and tend to go forward advantageously under moderate heat. An appropriate catalyst is 2,2'-azobis(2-methylpropionitrile) which is sometimes called azobisisobutyronitrile or, as hereinafter, AIBN. Also, or as an alternative, actinic radiation favors the reaction.

In carrying out the addition of a dithiol compound to an oxazoline compound containing an olefinic unsaturation, it will usually be preferred to combine a first reactant with the free radical catalyst if one is employed, and thereafter add, with continuous stirring and heating, the second reactant portionwise and with stirring to complete the reaction mixture. Which of the two reactants is first to be introduced into a reaction vessel is optional, or can be decided upon the basis of the properties of the materials employed. Thus, if the dithiol compound is a solid except liquefying when heated, it may be desired to add such dithiol compound first to the reaction vessel and, by heating, liquefy it; if both are liquids, then the one to be added first to the reaction vessel may be chosen upon the basis of suppression of odor of dithiol, if any, or the like.

It will usually be preferred that the reactants be combined by the addition, to the reaction mixture, of the second reactant, slowly, portionwise, or drop-wise; with heating at a reaction temperature and continuous stirring.

Upon the completion of the combining of the reactants, the elapse of a further interval of reaction time is usually advantageous, and during such interval of time, heating can be maintained at the reaction temperature to carry the reaction to such degree of completion as is believed efficient. In general, a further reaction interval of the completed reaction mixture of the general order of duration required earlier to combine the reactants gives good results.

The unsaturated oxazine or oxazoline compound, in its turn, is readily prepared by reacting an appropriate bishaloimidoester in the presence of strong base whereby to cyclodehydrohalogenate it.

The bishaloimidoester compound, in its turn, is readily prepared by the reaction between an alkylene chlorohydrin or substituted alkylene chlorohydrin and a saturated haloalkyl cyano compound or an unsaturated alkenyl cyano compound in the presence of hydrogen chloride. No unusual reactants or catalysts are involved; and yields are good.

The reaction can be regarded as following the general course indicated in the succeeding general formulae which is illustrative of the reaction but not necessarily of the scope of the substituents and other variables. Such matters are as hereinbefore described and hereinafter claimed.

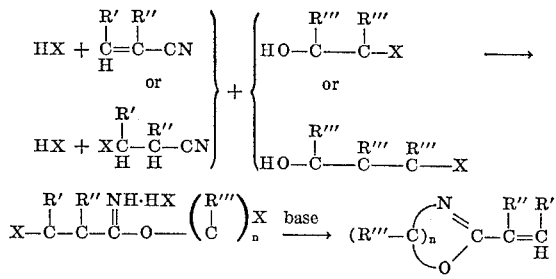

Desirably, the preparation of the instant compounds goes forward in the absence of water; and under inert gas blanket. The use of inert solvent is desirable. Supplied reactants are preferably scrubbed of water before being introduced to the present reaction system.

The needed alkenyloxazolines and alkenyloxazines are readily prepared, as above noted, from the corresponding cyanoalkenyl compounds. A cyanoalkenyl compound is obtained, or prepared, wherein the cyano group appears at a site where an oxazine or oxazoline is to appear. Substituents and the like in the alkenyl group appear in the products.

The precursor compound having a cyano group is simultaneously supplied with a lower alkylene chlorohydrin and with HCl as a dry gas, to obtain a reactive bishaloimidoester intermediate. This intermediate is then cyclodehydrohalogenated with base that accepts the elements of hydrogen halide, to obtain the intermediate alkenyloxazine or alkenyloxazoline, Such intermediate is then reacted with $H_2S$ or a dithiol, as required, to prepare the mercaptoalkyl- or mercaptoaryl oxazine or oxazoline compounds.

The unsaturated cyano compounds useful as precursors in this invention are, in general, articles of commerce. Representative such compounds are to be found in, for example catalog No. 14 (1969–1970) of Aldrich Chemical Company, and see especially pp. 600–602 for a topical listing with synonymy.

The compounds are readily prepared. Aliphatic cyano compounds, under the designation of "nitriles" are prepared according to U.S. Pat. 2,770,643 and the isolation of the unsaturated substances is routine. Alternatively, the procedures of Bailey et al. are available; 1958 Journal of the Chemical Society 4508. The aromatic cyano compounds with aliphatic unsaturation have long been available: as an early preparation, note the 1884 method of Kruss, 17 Berichte der deutschen chemischen Gesellschafft 1768.

An excellent review has been published, within the compass of which are to be prepared all the cyano compounds needed to practice the instant invention, at 42 Chemical Reviews 189, and in the references there incorporated. That review is incorporated here to the extent necessary to practice this invention.

The reaction scheme hereinabove set forth illustrates the preparation of an oxazoline having a single ethylenic substituent which may, itself, have substituents. Chemists will recognize that by the use, as starting material, of a longer chain cyano compound, aliphatic or aromatic, in reaction with chlorohydrin compound, such unsaturated substituent upon oxazoline is readily prepared in longer chain lengths, or containing other chemical moieties. The reaction scheme set forth hereinabove is illustrative only.

For other synthetic routes, see the summary by Wiley et al. in 44 Chemical Reviews 447–475. As noted, the oxazines and the oxazolines are prepared in similar routes. Other modes of synthesis are available.

A compound such as a single mercaptoaryl oxazoline is readily synthesized from a carboxyphenol such as hydroxybenzoic acid, the isomery of which is optional; the hydroxyaromatic acid is reacted with a "capping" agent, such as dimethylthiocarbamoyl chloride. This reactant esterifies the phenolic hydrogen, protecting it during subsequent stages of the reaction to prepare the oxazoline compound. The resulting O-(carboxyphenyl)-dimethylthiocarbamate, which is produced under basic conditions, and with basic chloride, such as sodium chloride, as by-product, is heated and undergoes a rearrangement. The resulting product is the S-(carboxyphenyl)-dimethylthiocarbamate product. This, then, caused to react with thionyl chloride, obtains the chloroformyl derivative at the site formerly occupied by the carboxyl. Reaction of this chloroformyl derivative with aziridine gives rise to the S-(2-chloroethylcarbamoyl) phenyldimethylthiocarbamate product. This product, reacting in the presence of alcoholic base, such as sodium hydroxide in ethanol, at the chloroethylcarbamoyl moiety cyclizes to obtain an oxazoline, while at the dimethylthiocarbamate moiety hydrolyzes to obtain a mercaptan. As a result of heating in the presence of alcoholic sodium hydroxide, there is produced a desired mercaptophenyl oxazoline in which the isomery of mercapto with respect to oxazoline is, to a close approximation, that of the isomery of the original hydroxyaromatic acid.

When it is desired to produce, instead of an oxazoline, an oxazine compound, azetidene compounds will be chosen in place of the aziridine compound here employed.

Also, substituents upon the carbon atoms of the aziridine or azetidene appear, in the corresponding loci, as substituents upon the oxazoline or oxazine; and substituents upon the aromatic ring originally characterized as a hydroxybenzoic acid appear upon the resulting mercaptophenyl oxazoline upon the phenyl ring. Thus, substituents of a wide range may appear upon the aziridine, azetidene, or aromatic nucleus, as hereinbefore noted.

The reaction of alkenyloxazine or oxazoline and dithiol compound characteristically leaves small amounts of volatiles uncombined in the reaction mixture. In this situation, maintaining the reaction temperature, the reaciton vessel interior is advantageously placed under sharply subatmospheric pressure ("vacuum"), and such volatiles drawn off.

Skilled chemists, in possession of the cited prior art and in view of the discussion foregoing, will be able to prepare the monomers of the present invention.

The polymerizing of the instant monomers is readily carried out by heating the monomer. Polymerization temperatures are characteristically substantially higher than monomer synthesis temperatures. The resulting product is thermoplastic, but it may be more convenient to polymerize the monomer in the shape it is to occupy when cured. Also, when polymerization has gone forward only partially towards a chosen end point, and the resulting partially polymerized intermediate material is of viscosity and adhesivity several fold greater than is characteristic of the unreacted monomer, the material can be drawn into filaments or passed through a spinneret or produced as a film and in that form further heated to complete polymerization.

To make use of its thermoplasticity, higher temperatures are required than are usually expected in the melting of polymers. The transition from hard to liquid takes place relatively promptly as required temperatures are attained. An inert gas blanket may be chosen, to reduce darkening of the polymer with heat.

The polymers thus produced are pale straw to yellow-brown in color, and are very slightly elastic-yielding to hand pressure: they are exceptionally tough under impact; have high resistance to propagation of a tear or break, and have, in general, high resistance to abrasive wear and chemical attack. When ignited, they burn reluctantly and, in a lump, may be self-extinguishing. Sulfur dioxide is among the typical combustion products.

The best mode now known to the inventors of practicing the same is now illustrated.

EXAMPLE 1

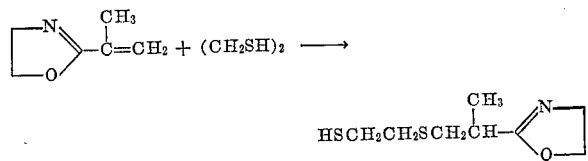

In a glass reaction vessel of 100 cubic centimeters capacity, 18.8 grams (0.2 gram mole) of ethane dithiol, a liquid, and 0.33 gram (0.002 gram moles) of AIBN (catalyst) are combined, and, with continuous mixing and stirring, heated to 70° C. Into the mixture of these two components are added, dropwise over a period of 1.25 hours, and with continuous stirring, 22.2 grams (0.2 gram mole) of 2-isopropenyl-2-oxazoline. After the addition has been completed, the resulting reaction mixture is maintained at 70° C. for 2.5 hours further, to permit the reaction to go to completion. Thereafter, the temperature of the mixture is permitted to equilibrate with room temperature, and connected with a vacuum line at room temperature to withdraw volatile substances. The vacuum is maintained for approximately two hours. At the conclusion of this time, the reaction vessel contains a light amber colored liquid 2-((2-(2-oxazolin-2-yl)propyl)thio) ethanethiol product which, in one case, was found to weigh 38.1 grams. Such weight represents a 93 percent yield based on starting oxazoline compound. The product was analyzed for contents of carbon, hydrogen, nitrogen and sulfur and found to contain 47.8, 7.7, 7.0, and 29.5 weight percent of these elements, respectively, as compared with theoretical values of 46.8, 7.36, 6,82, and 31.2 percent, respectively. A sample was examined by infrared spectrum analysis and another sample scrutinized by nuclear magnetic resonance. The resulting spectra were found to be consistent with the assigned structure.

EXAMPLE 2

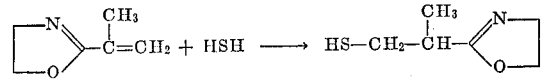

In the present example, the dithiol reactant is hydrogen sulfide, and it is employed in its ordinary, gaseous form. Progress of the reaction can be expedited by ultraviolet radiation. The product is β-methyl-2-oxazoline-2-ethanethiol.

In a 500-milliliter glass reaction vessel, a solution of 0.43 gram (0.0026 gram mole) of AIBN in 400 milliliters absolute, denatured ethanol (Formula 2B) is cooled to 5° C. At this temperature, gaseous hydrogen sulfide is introduced by a glass tube at a point under the surface and near the bottom of the pool of alcoholic catalyst solution. The resulting mixture is vigorously stirred. Released hydrogen sulfide is vented away in a negative pressure hood.

In this situation, then, 2-isopropenyl-2-oxazoline is added slowly, dropwise, and with continued stirring and introduction of gaseous hydrogen sulfide, until 22.2 grams (0.2 gram mole) oxazoline compound has been added over a period of 1.5 hours. Throughout the addition of the oxazoline compound, radiation from an operating mercury vapor lamp is played upon the outside of the glass reaction vessel, to expedite progress of the addition reaction.

Upon the completion of the addition of the isopropenyl oxazoline compound, cooling, stirring, and the ultraviolet irradiation are continued for an additional hour to carry the reaction more nearly to completion. Thereupon, the reaction mixture is permitted to equilibrate with room temperature, and thereafter, during 45 minutes, to increase in temperature to 35° C.

Thereafter, the reaction vessel interior and contents are placed under a pressure of 60 millimeters mercury absolute, at room temperature, for a period of time to remove excess ethanol and hydrogen sulfide and the distillation of these substances is completed by holding the reaction mixture at 40° C. under a pressure of 5 millimeters mercury absolute.

As a result of these procedures, there are obtained 27.6 grams of a liquid β-methyl-2-oxazolineethanethiol product as a residue, orange in color in a yield of 95 percent based on starting oxazoline compound. The product is scrutinized by nuclear magnetic resonance and infrared absorption. The resulting spectra are consistent with the assigned structure; there is an intense —C=N— infrared absorption maximum characteristic of the oxazoline at 1670 reciprocal centimeters.

Similarly, cinnamonitrile is reacted simultaneously with ethylene chlorohydrin and hydrogen chloride under inert gas blanket and in the substantial absence of moisture; and the resulting intermediate is cyclodehydrohalogenated with sodium hydroxide and the resulting β-2-oxazolinyl-styrene reacted with hydrogen sulfide to obtain an α-phenyl-2-oxazolineethanethiol product. The mixture resulting from the preparatory reaction is water washed and the aoueous phase discarded. Product is distilled in vacuum to obtain an orange-yellow α-phenyl-2-oxazolineethanethiol product as a yellow liquid of molecular weight 207.25. This product readily homopolymerizes under the influence of heat.

Also, the β-2-oxazolinylstyrene prepared as above is reacted with polyalkylene sulfide that has mercapto terminal groups characteristic of such molecules, to obtain an α[α-[(2-oxazolin-2-yl)methyl]benzyl-ω-mercaptopolythioethylene product as a viscous semisolid.

In another preparation (2-chloropropenyl) benzene is converted by simple metathesis to α-methyl-cinnamonitrile. This, by dry reaction with trimethylene chlorohydrin and hydrogen chloride under dry, inert gas, and subsequent cyclizing with NaOH yields 2-(α-methyl-styryl-2-oxazine. This material, in turn, is reacted with 1,4-benzenedithiol (which melts at 97–98° C.) to obtain, in good yield, a p-((α-(1-(5,6-dihydro-4H-1,3-oxazin-2-yl)-ethyl)benzyl)thio) benzenethiol of the formula

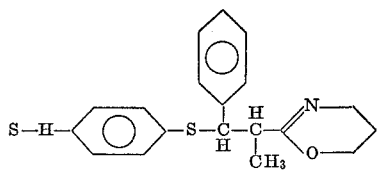

The product is recrystallized from benzenecyclohexane as yellow, crystalline solid.

A product is obtained which is homologous with the above when employing 2,5-dimethyl-1,4-benzenedithiol in place of the 1,4-benzenedithiol above discussed; in this situation the product is of the formula

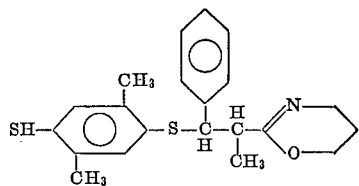

The corresponding oxazoline compounds are formed when employing, instead of the trimethylene chlorohydrin above discussed, rather ethylene chlorohydrin, in preparing the heterocyclic compound from the cyano compound.

Similarly, with one or more substituents on the heterocyclic ring, the thiol derivative is readily prepared. Illustratively, 4,4-dimethyl-2-isopropenyloxazoline (boiling at 58°–59° C. under pressure of 24 millimeters mercury absolute) is reacted with α-ω-eicosanedithiol (prepared from the corresponding diol in the method of Kramer and Reid, 43 Journal of the American Chemical Society 880 (1921)).

The product, 20-((2-(4,4-dimethyl-2-oxazolidinyl)-propyl)thio)-1-eicosanethiol, is a waxy, hydrophobic, semisolid, which with heating at a polymerization temperature produces a polymer according to this invention. The polymer is hydrophobic. Various ring-substituted oxazines and oxazolines are prepared according to U.S. Patent 2,897,182.

Polymerization of monomers to obtain nylons

Given a chosen monomer or mixture of monomers all of the instant invention, in order to polymerize it to obtain a nylon, it is necessary only to heat the monomer to a polymerization temperature under conditions which minimize or eliminate oxidation. Under these circumstances, a group of monomers transforms itself, in a polymerization route which is incompletely understood, to obtain a polymer of which the full structure is not known with confidence, but of extraordinary properties. It is believed that the present polymers are polyamides of the general structure hereinbefore set forth.

The heating interval required to effect polymerization varies more or less inversely as the upper limit temperature to which heating is carried out; but, nominally, at temperatures in the range of 100–200° C., a polymerization interval on the general order of one to two hours suffices. The upper limit temperature to be employed is controlled, in part, by the desire to avoid pyrolysis of the monomers or polymers involved. Depolymerization has not been observed.

It is unnecessary to take exhaustive pains to eliminate oxygen, since such minor degradation as occurs from small amounts of oxidation can be tolerated. In general, good results are obtained when the mass to be polymerized is blanketed under slowly flowing nitrogen or other non-oxidizing gas. In other situations other means of excluding oxygen and air may be preferred.

During the heating and polymerization interval of time, the monomer mass, originally liquid at employed temperatures, polymerizes to become an infusible, tough, slightly yielding, elastic, usually pale colored to tan resin, although sometimes of darker color; the polymerized resin becomes relatively more yielding and pliable when warm and relatively less so when cold; it does not melt or flow at temperatures below 200° C. It tends to manifest a more sharply defined melting temperature than do most polymers. The polymer is insoluble in all organic solvents which have been tried upon it, including those best known for dissolving polymers.

Films, moldings, castings, filaments, and the like prepared by polymerizing monomers of the present invention display extraordinary ability to absorb shock and resist tear, and are, characteristically, of extraordinary strength and toughness by all criteria for the measurement of polymer strength.

In view of the properties described, foregoing, it is apparent that when a formed article of the polymer of this invention is desired, it may be preferred that the monomer be formed to or approximately to the desired form of the resulting solid prior to curing of the monomer, or a mass of monomer should be provided large enough that the desired article can be cut, machined, carved, or otherwise shaped out of the mass of cured polymer as a solid block, billet, ingot or the like. Similarly, fibers and the like, when desired, are at times preferably formed during polymerization.

Those skilled in the arts of polymerizing monomeric substances will be enabled, from the description foregoing, to practice the instant invention. The best mode now known of practicing the polymerization of the instant invention is described below.

EXAMPLE 3

Polymerization of 2-((2-(2-oxazolin-2-yl)propyl)thio) ethanethiol

A portion of the monomeric substance named in the headnote of this example, a light amber colored liquid, was poured into a mold defining a shape desired in the finished, thermoset, cured polymeric article. The mold and liquid contents were positioned in an oven the interior of which was flooded with slowly flowing nitrogen gas. The oven was heated and maintained for approximately two hours at a temperature of 125–150° C. Polymerization of the resin and conversion to a thermoset material did not require the entire period of time, having gone to completion at some time, not noted, earlier than the end of the heating period. The resin was removed from the oven and then removed from the mold and examined and found to be a remarkably tough, slightly yielding, elastic light yellow resin which was a little more pliable when hot than when cold, but had no evident tendency to melt or flow at any temperature up to 300° C.; it was challenged with a large number of standard solvents of known utility in commercial dry cleaning of fabrics and of known activity in dissolving organic polymers, including benzene, toluene, acetone, methyl ethyl ketone, dimethyl formamide, liquid aliphatic hydrocarbons (petroleum ether) tetrahydrofuran, dimethyl sulfoxide, and others; evaporation of the solvent in no case yielded a deposit, indicating that the solvent had not dissolved any evident part of the polymer. Whether hot or cold, the polymer was found to be remarkably strong and resistant to impact fracture, and of extraordinary ability to withstand shock and to resist tearing and the propagation through it of a tear.

EXAMPLE 4

Polymerization of β-methyl-2-oxazoline-2-ethanethiol

The procedures of this example were carried out as were those described in Example 3, foregoing, but employing the monomer named in the example headnote. The result was a polymer resembling that obtained in the polymerization of Example 3; it was light in color, slightly yielding, elastic, extraordinarily tough and resistant to impact, shock, and tearing.

EXAMPLE 5

The instant example was carried out as was Example 4, but without nitrogen blanket, and in the presence of air. At an unrecognized time during the heating, carried out procedurally as described in Example 3, foregoing, the β-methyl-2-oxazoline-2-ethanethiol apparently underwent some manner of chemical degradation with the result that it became a semisolid mass and did not produce a resin; and upon repeated testing appeared to have become in some way incapable of homopolymerization under any conditions known to the inventors. The product may have been a dimer of some kind.

Because the molecular structures are simple, because the starting materials are relatively inexpensive, and because the polymer products produced from them are of excellent properties, certain of the monomers of the instant invention are preferred. Among those that are preferred are

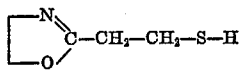

2-(2-oxazolin-2-yl)ethanethiol

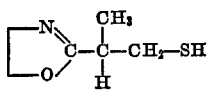

2-(2-oxazolin-2-yl)propanethiol

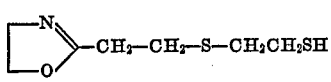

2-((2-(2-oxazolin-2-yl)ethyl)thio)ethanethiol

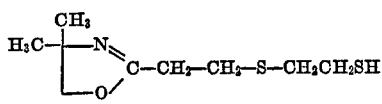

2-((2-(4,4-dimethyl-2-oxazolin-2-yl)ethyl)thio)ethanethiol

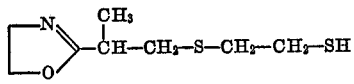

2-((2-(2-oxazolin-2-yl)propyl)thio)ethanethiol

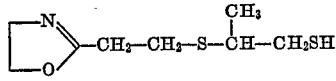

2-((2-(2-oxazolin-2-yl)ethyl)thio)propanethiol and

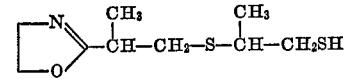

2-((2-(2-oxazolin-2-yl)propyl)thio)propanethiol.

We claim:

1. A process for preparing polymeric material comprising heating to a temperature of between about 100 to 200° C. in a nonoxidizing atmosphere a compound of the formula:

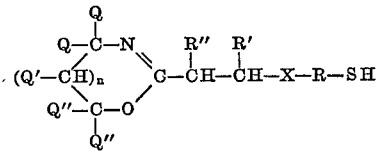

wherein R is alkylene of from 2 to 20, both inclusive, carbon atoms, arylene of from 6 and 10 carbon atoms, alkylarylene of from 7 to 15 carbon atoms, both inclusive; or R and with it X, can be void; R', R", Q' and Q" are independently selected from hydrogen, alkyl of from 1 to 4, both inclusive, carbon atoms or R' can be phenyl; Q in any occurrence is independently hydrogen, methylol; X is sulfur; and $n$ is zero or 1.

2. A polymeric material produced by the process of claim 1.

References Cited
UNITED STATES PATENTS

| | | | |
|---|---|---|---|
| 2,502,548 | 4/1950 | Allen et al. | 260—78 |
| 3,538,063 | 11/1970 | Sorg et al. | 260—79 |
| 3,644,345 | 2/1972 | Siegrist et al. | 260—240 |

DONALD E. CZAJA, Primary Examiner

H. S. COCKER, Assistant Examiner

U.S. Cl. X.R.

260—78 A, 78 L, 78 TF, 79